3,577,298
METHOD OF MAKING A BUILDING PANEL

Scilla de Glauco, 3921 Vasconia St. 33609, and Claudio Poccia, 4746 W. Anita Blvd. 33611, both of Tampa, Fla.
No Drawing. Filed June 5, 1969, Ser. No. 832,553
Int. Cl. B44c *1/06*
U.S. Cl. 156—239                      14 Claims

ABSTRACT OF THE DISCLOSURE

Compositions for building materials such as partitions, walls, etc., which are readily prepared and have all of the architectural requirements for prefabricated building materials. They consist of fiber glass, PVC expansion panels, unsaturable polyester resin, comminuted amethyst rock and, optionally, aerated calcium carbonate, besides the usual accelerators, diluents and catalysts.

---

The present invention relates to improved building materials composition and, more particularly, to improved building materials such as, for example, panel boards and partition panels employable in prefabricated types of construction.

Building panel boards for walls and partitions in prefabricated architectural structures, such as dwellings, are not new, per se, although the emphasis has thus far been directed to materials of construction which are conventional and long since known, such as plywood and fiberboard. Plastic materials have been introduced on the market somewhat more recently, but in very limited and specific applications, because it has been recognized that, while they are extremely useful in certain aspects, they fail in meeting other necessary, architecturally required properties.

Industry has recognized the need for a material composition which, while being readily reduceable into building panels for rapid assembly, possesses all of the architectural requirements, such as resistance to abnormally high and low temperatures, good dielectric properties, good chemical weatherability, resistance to rot and mildew, impermeability to atmospheric elements, resistance to acids and to saline solutions, resistance to termite attacks, fire-retardant properties, insulation against thermal and acoustic abnormalities, and architectural rigidity. Such a material, obviously, will find practical use in the most disparate applications, both geographically from the tropics to the intemperate cold regions and structurally from schools to motels, hospitals, dwellings and, most important, to low income and functional housing projects.

The above mentioned requisites and architecturally desirable properties have now been met by the present invention, the main object of which is to provide a building materials composition possessing substantially all of the above mentioned properties and characteristics and employable suitably in the fabrication of building panel boards and the like.

It is another object of the present invention to provide a fabricated building material board, such as wall, partition and the like readily usable in the construction of dwellings and other architectural structures.

It is still a further object of the present invention to provide an economic, simple and direct method of fabrication of such materials of construction, which method requires no expensive or special equipment.

These and other objects and advantages of the invention will become apparent from the following detailed description of the embodiments thereof.

Briefly stated, the building materials composition of the present invention consists essentially of the following ingredients:

(a) an unsaturate polyester resin possessing properties of sprayability, thixotropicity, low viscosity, non-preaccelerations and fire-extinction. The preferred polyester resin is one sold by Montecatini, an Italian company, under the trade name "Gabraster 1409." This resin has a viscosity of 1650 centipoises at 77° F., an exothermic peak of 160° C., a tensile strength of 995–1420 lbs./in.$^2$, a modulus of elasticity of 384–455 lbs./in.$^2 \times 10^3$, a heat distortion temperature of 131–140° F.

(b) a surface finisher suitable for polyester resins such as those given hereabove under (a). This material gives a surface coating of protective and finishing qualities and is hardenable in air. There are numerous compounds available on the market for use in conjunction with unsaturate polyester resins of the type hereabove described, such as, for example, that hereinafter identified as, and known in the trade under the trade name "Gelcoat";

(c) a catalyst consisting of a solution of methyl-ethyl-ketone peroxide diluted in di-methyl-phthalate and hereinafter defined as "Catalyst F";

(d) a diluent, preferably a styrene resinous compound, compatible with the unsaturate polyester resin and suitable to lower the viscosity thereof and increase the impregnation ability of the polyester resin when this is contacted with such materials as fiber glass;

(e) fiber glass, such as that hereinafter identified as "AS/16SF";

(f) an accelerator, preferably a cobalt naphthenate dissolved in a suitable solvent such as naphtha;

(g) finely comminuted minerals such as amethyst crystalline materials. Amethyst minerals resemble in many respects silica or similar materials;

(h) a polyvinyl chloride possessing, among others, properties of thermal and acoustic insulation, expanded cellular structure, resistance to low temperatures, impermeability and resistance to acids. However, the preferred polyvinyl chloride material is the one sold under the name "Cadorite B" and having the following characteristics: specific gravity 2.809 lbs./ft.$^3$, air permeability 0.000, thermal conductivity coefficient $\lambda$ 0.03 Kcal./m./hr./° C., compression strength 2.41–2.55 lbs./in.$^2$, tensible strength 12.7–15.4 lbs./in.$^2$, mass resistivity $10^6$/Mohm./cm.

In the preparation of certain specific building materials, such as reinforced bases for supporting walls or partitions, aerated calcium carbonate is also utilized in the composition, as it will be described more fully hereafter.

As a first embodiment of the invention, the preparation of panels for walls or partitions will now be described in detail, to serve as illustration of the invention.

Two molds are readied for the fabrication of a partition panel. They may be of plywood, although other materials suitable as molds may be employed. The size of the molds should be substantially corresponding to the finished product and at least one surface of each mold must be substantially plane and smooth.

The smooth surface is first treated with wax, although equivalent substances could be used, so as to impart to the surface the ability of detaching itself readily from the ultimate product.

After wax-treating, the surface is coated by means of a spray gun, although any equivalent means may be employed, with a 12-20 mil thickness of "Gelcoat" to impart to the unsaturate polyester resin used thereafter an impervious, hard finishing coat. Prior to applying the "Gelcoat," this compound is diluted in about 10% by weight solution, based on the "Gelcoat," of styrene to which is added about 3%, based on the weight of the "Gelcoat," of catalyst F, namely, a solution of MEK peroxide in dimethyl phthalate. The spraying application may be effected at room temperature.

After the "Gelcoat" layer has sufficiently gelled, a first reinforcing layer is applied by means of a roller or brush to the gelled coating of the mold surface. This layer consists of AS/16SF glass fibers, although equivalent materials may be employed, previously admixed with unsaturated polyester resin, an accelerator, a catalyst and a diluent. The polyester resin is "Gabraster 1409" and is used in a weight ratio of 2 to 4 parts of resin per part of glass fibers. The accelerator specifically recommended is cobalt naphthenate dissolved in naphtha and employed in an amount of about 0.5 weight percent based on the resin. The catalyst may be the same MEK catalyst F aforementioned and the amount, based on the resin, is preferably 1.5% by weight. The diluent is styrene in an amount of 5% by weight, based on the polyester resin. The application of this first reinforcing layer may be effected at room temperature.

After the first layer has been applied, a second layer is impregnated onto the first in the same manner. However, the admixture of this second layer should contain in addition 8 to 10% by weight, based on the polyester resin, of finely comminuted particles of amethyst rock.

Following the second application or impregnation, the two coated and impregnated surfaces of the mold are assembled with an expansion panel interposed therebetween. This panel, which may be from 1 to 3 inches thick, depending on the thickness desired in the ultimate, finished product, is consisting of, preferably, "Cadorite B" polyvinyl chloride material. The expansion panel is adhered to the two surfaces prior to their solidification, and the whole assembly is then compresed together at, for example, room temperature.

The two molds are, finally, detached from the sandwiched product after solidification has occurred. This takes place, usually in less than one hour, but varies with the size and thickness of the finished board. The product is then polished and shaped into the desired size and configuration.

Building panels for partitions, walls, and the like are usually provided with base supports which, besides fulfilling the function of supporting the panels, serve as interminates between the panels and the ground floor. As a second embodiment of the invention, the preparation of a typical base support will now be illustratively described in detail.

A mold, usually a metal mold, is employed for this purpose. The mold may be rectangular or square in its cross-section and has, generally, one longitudinal surface thereof open for the pouring of the materials forming the base support.

The inner surfaces of the mold are first coated with wax to enable the finished product to detach itself readily from the mold. Subseqeuntly, the waxed surfaces are impregnated with a thin layer of a polyester resin, such as "Gabraster 1409," diluted with 5%, based on the weight of the resin, of styrene diluent, admixed with about 0.5%, based on the weight of the resin, of Co naphthenate accelerator and about 1.5% by weight, based on the resin, of catalyst F hereabove described. This coating is applied on the three longitudinal and two terminal inner surfaces of the mold by means of, for example, a brush or a roller.

Following the impregnation, a steel rod or equivalent metal reinforcer such as bars, grids, chips, is laid on the bottom of the metal mold and the remaining cavity is filled with a mixture of, by weight, about 50% "Gabraster 1409" and about 50% aerated calcium carbonate, to which mixture was added based on the weight of the resin, about 0.5% of an accelerator, such as cobalt naphthenate dissolved in naphtha diluent, and, based on the total weight, about 2% of catalyst F described hereabove.

After the mixture of polyeseter resin and aerated calcium carbonate has been poured, two successive layers of glass fibers are caused to impregnate upon the polyester resin. The second layer should be applied after the "Gabraster 1409" has gelled.

The fourth longitudinal surface of the mold is thus formed by the poured material. After hardening, the product is removed readily from the mold, polished and sprayed with a light coating of "Gelcoat," mentioned hereinbefore, to which some paraffin may be added for finishing, aesthetical effect.

The following are typical, illustrative compositions employed in the preparations of panel boards and base supports described hereinabove:

Composition A (for application of Gelcoat coatings)

|  | Lbs. |
|---|---|
| Fire-extinguishing Gelcoat | 1.584 |
| Styrene diluent | 0.176 |
| MEK | 0.053 |

Composition B (for first impregnation of Gelcoat coatings)

|  | Lbs. |
|---|---|
| Gabraster 1409 [1] | 2.640 |
| Glass fibers AS/16SF | 0.990 |
| Accelerator, Co naphthenate | 0.059 |

[1] Previously mixed with 0.0132 lb. of Co naphthenate, 0.0396 lb. of catalyst F, and 0.132 lb. of styrene diluent.

Composition C (for second impregnation of Gelcoat coatings)

|  | Lbs. |
|---|---|
| Gabraster 1409 [1] | 2.640 |
| Glass fibers AS/16SF | 0.990 |
| Accelerator, Co naphthenate | 0.059 |
| Comminuted amethyst | 0.220 |

[1] Previously mixed as per composition B.

Composition D (for panel base supports)

| | |
|---|---|
| Gabraster 1409 | 51.25 lbs. or 25 parts. |
| Aerated calcium carbonate | 51.25 lbs. or 25 parts. |
| Accelerator, Co naphthenate | 2.57 lbs. or 1.3 parts. |
| MEK catalyst F | 2.05 lbs. or 1.0 part. |

Compositions A, B and C are given hereabove in weight per given area to be covered The values used represent the amounts of ingredients required to cover a surface area of 10.76 square feet. Composition mixtures to be prepared for different areas may be, therefore, readily calculated from the above values. Composition D, instead shows merely the weight relationship among the various ingredients for the preparation of a given batch of mixture, independent of the actual amount needed in any specific mold.

EXAMPLE I

Two molds of wood, measuring 1 m.$^2$ in area were used to prepare one partition panel board. The surfaces of the molds were smoothed and treated with a mirror glaze wax. Afterwards, a 20 mil thickness of Composition A was applied to the waxed surfaces by means of a spray gun at room temperature. When the layer had gelled sufficiently, the Composition B was applied by roller at room temperature and allowed to solidify sufficiently to accept the application of Composition C in the same manner. The two coated surfaces were then faced one against the other and a 3" panel of Cadorite B was inserted therebetween. The Cadorite expansion panel was adhered to the surface and compressed together therewith at room temperature for about 40 minutes, after which the molds were removed and the sandwiched composition was polished and cut into sections for testing.

EXAMPLE II

A metal mold, 3-feet long, having square cross-section and open longitudinally on one side, was used to prepare a base support beam. The inner surfaces of the mold were waxed, as in Example I, and then coated with Gabraster 1409 resin mixed with Co naphthenate (0.5 wt. percent based on the resin), a catalyst F (1.5 wt. percent based on the resin) and styrene diluent (5 wt. percent based on the resin). A 15 mil coating was applied by means of a roller at room temperature. Following, a steel rod was laid at the bottom of the mold and Composition D was poured thereon to fill the mold. Thereafter, two successive application of glass fibers AS/16SF were effected on the poured material, the second application taking place after the first one had gelled. The amount of glass fibers used in each application was calculated at 450 grams/m.$^2$. Compression of the ingredients was necessary to obtain the shaping of the product, which, after hardening of the poured material, was removed from the mold, polished, sprayed with a light coating of Gelcoat and paraffin and cut into sections for testing.

Tests

Rigidity and strength against both torsional and bending stresses are the typical requirements of architectural materials of construction. Sections of both the partition panel and the base support beam were therefore tested on an Instron testing machine and the central deflection was measured as a function of the load centrally applied. According to elementary elastic beam theory, $\Delta = PL^3/48EI$, where $\Delta$ is the central deflection, P is the central load, L is the length of the beam, and EI is the bending rigidity. The values observed were as follows:

| | Panel | Base support |
|---|---|---|
| Bending rigidity EI (lbs./in.$^2$) | 15,600 | 33,000 |
| Maximum flexural movement allowable (in.-bl.) | 1,440 | 5,800 |

A panel section, 2-inch wide was also subjected to a twisting movement. The torsional rigidity, using elementary theory, for a circular bar as a model is described by the equation $\phi = M_t L/JG$, where $\phi$ is the angle of twist for a length L, a twisting movement $M_t$ and a torsional rigidity JG. The results of the torsion tests are shown as follows:

Torsional rigidity JG (lbs./in.$^2$) _____ 6,600
Maximum twisting movement allowable (in.-lb.) __ 280

Additional tests effected on the building composition of the present invention have shown it to resist temperatures higher than 150° F. and lower than −60° F.; to be waterproof and resistant to rot and mildrew; to resist acids and saline solutions; to be resistant to termite attack; to be extremely fire-retardant; to be insulating against both thermal and acoustic abnormalities; to be economically manufacturable; and to require no special and expensive equipment.

While the present invention has been described with reference to typical embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed is:

1. A method of preparing monolithic architectural panels for prefabricated-type structure, which comprises providing a pair of rigid, smooth-surfaced sheets selected from wood, metal and equivalent material to serve as molds and applying to one surface of each of said molds, in succession:
    (a) a layer of a finishing surface agent compatible with unsaturate polyester resins;
    (b) a first coating consisting of glass fibers, an unsaturate polyester resin, an accelerator, a catalyst, and a diluent;
    (c) a second coating consisting of the ingredients of said first coating and finely comminuted amethyst rock;
    (d) facing the coated surfaces of said molds in predetermined spaced relationship with each other;
    (e) interposing therebetween the coated surfaces an expansion panel of polyvinyl chloride fire-extinguishing, cellular material;
    (f) compressing the thus sandwiched expansion panel by external pressure to adhere to said coated surfaces; and
    (g) removing the finished architectural panel from said mold.

2. The method of claim 1, wherein said surface agent, prior to applying, is diluted in a solution of about 10% styrene containing about 3% of methyl-ethyl-ketone peroxide dissolved in di-methyl-phthalate, said percentages being based on the weight of said agent.

3. The method of claim 1, wherein said unsaturate polyester resin is employed in a weight ratio of from 2 to 4 parts of resin to 1 part of glass fibers.

4. The method of claim 1, wherein said accelerator is cobalt naphthenate dissolved in naphtha and is employed in an amount of about 0.5% based on the weight of said resin.

5. The method of claim 1, wherein said diluent is styrene and is employed in an amount of about 5% based on the weight of said resin.

6. The method of claim 1, wherein said catalyst is methyl-ethyl-ketone peroxide dissolved in di-methyl-phthalate and is employed in an amount of about 1.5% based on the weight of said resin.

7. The method of claim 1, wherein said comminuted amethyst rock is employed in an amount of about 8 to 10% based on the weight of said resin.

8. The method of claim 1, wherein said layer and said first and second coatings are applied at room temperature.

9. A method of preparing monolithic architectural panel base supports for prefabricated-type structures, which comprises:
    (a) providing a box-like, rigid, innerly smooth surfaced mold selected from wood, metal and equivalent material;
    (b) applying to the inner surfaces of said mold a coating consisting of unsaturate polyester resin diluted in a diluent and admixed with an accelerator and a catalyst;
    (c) introducing into said mold a reinforcing metal element preferably selected from the group consisting of rods, bars, grids and chips;
    (d) pouring into the said mold a mixture consisting of unsaturate polyester resin, aerated calcium carbonate, an accelerator and a catalyst;
    (e) impregnating said poured mixture with at least one application of glass fibers; and
    (f) after the molded materials have hardened, removing the finished panel base support from said mold.

10. The method of claim 9, wherein said diluent is styrene and is employed in an amount of about 5%, based on the weight of said resin.

11. The method of claim 9, wherein said accelerator is cobalt naphthenate dissolved in naphtha and is employed in an amount of about 0.5%, based on the weight of said resin.

12. The method of claim 9, wherein said catalyst is methyl-ethyl-ketone peroxide dissolved in di-methyl-phthalate and is employed in an amount of about 1.5-2% based on the weight of said resin.

13. The method of claim 9, wherein said mixture of polyester resin, calcium carbonate, accelerator and catalyst contains substantially equal amounts, by weight, of resin and carbonate.

14. The method of claim 9, wherein said glass fibers impregnated on said poured mixture are in an amount equivalent to about two pounds of fibers per square meter of area to be impregnated.

References Cited

UNITED STATES PATENTS

| 3,393,107 | 7/1968 | Wilburn | 156—242 |
| 3,438,838 | 4/1969 | Pellicer et al. | 156—242X |
| 3,458,609 | 7/1969 | Smith et al. | 156—242X |

BENJAMIN R. PADGETT, Primary Examiner

S. J. LECHERT, Jr., Assistant Examiner

U.S. Cl. X.R.

156—246, 289, 300, 309, 315; 117—29, 72, 92, 100; 161—41, 169, 174, 403; 264—241, 300